Sept. 26, 1967  C. M. CASON  3,343,414
GAS VELOCITY PROBE FOR FLOWING IONIZED GASES
Filed Jan. 5, 1965

Charles M. Cason,
INVENTOR.

BY Harry M. Saragovitz
Edward J. Kelly
Herbert Berl
Alfred E. Smith

# United States Patent Office 3,343,414
Patented Sept. 26, 1967

3,343,414
GAS VELOCITY PROBE FOR FLOWING
IONIZED GASES
Charles M. Cason, Huntsville, Ala., assignor to the United
States of America as represented by the Secretary of
the Army
Filed Jan. 5, 1965, Ser. No. 423,612
1 Claim. (Cl. 73—194)

ABSTRACT OF THE DISCLOSURE

A direct electrical method for measuring the velocity of a flowing plasma. Electrodes are placed in the flow for detecting the polarization voltage and so positioned as to be unaffected by the self-loading effect of the flowing plasma.

This invention may be manufactured or used by or for the Government for governmental purposes without the payment of any royalty thereon.

This invention relates generally to gas velocity measurements and more particularly to a direct electrical method for measuring the velocity of a flowing plasma.

Prior art methods for measuring gas velocity in a flowing plasma may be categorized as average type measurements and local measurements. One prior art method measures the gas velocity of a plasma jet with a pair of pickup coils, one located upstream from the other. "Noise" signals from each coil are displayed on a double gun oscilloscope and the record photographed. In this method the gas velocity is estimated by the time delay in the signal between the upstream and the downstream coils. Another method utilizes RF coils which have the magnetic field therein distorted by a moving plasma, this distortion is then measured and related to the gas velocity. A third prior art method uses photomultiplier tubes with lenses as the sensors and is, except for the sensors, essentially the same as the method using pickup coils described above. Methods which use detectors to observe disturbances at different axial positions to relate time delays to velocity will give, at best, average velocities for wide separations, or inaccurate velocities for very close spacings of detectors. This property is comparable in a way to an "uncertainty principle."

Disadvantages of the above methods are that the data must be photographed point by point and analyzed at a later time and also that good spatial resolution is not achieved. The present invention overcomes these disadvantages by measuring the polarization voltage induced in a flowing plasma while the plasma flows transversely of an applied magnetic field. Since this voltage is directly related to the velocity of the gas the velocity can be read directly from the meter used to measure the voltage.

Accordingly, it is an object of this invention to provide a direct electrical measurement for determining the velocity of a flowing ionized gas.

It is a further object of the present invention to provide a gas velocity probe that does not significantly affect the gas velocity during measurement thereof.

These and other objects and advantages will become apparent upon reference to the following detailed description considered with the accompanying drawings wherein.

Figure 1:
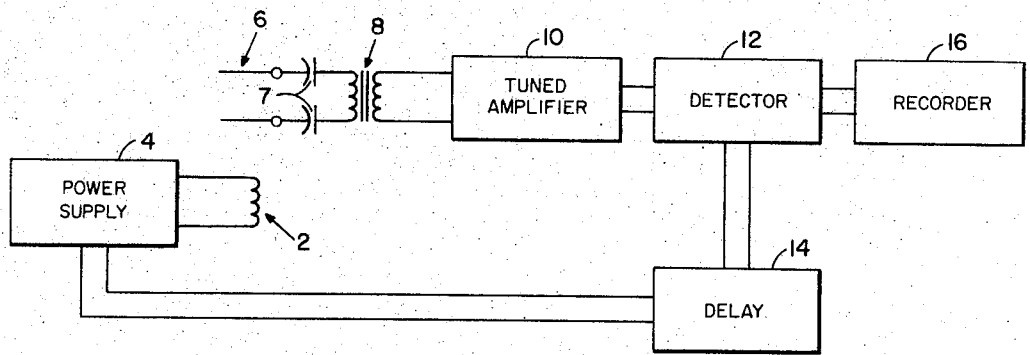
FIGURE 1 is a block diagram illustration of a preferred embodiment of the present invention.

When a plasma streams through a transverse magnetic field B, with a velocity v, an orthogonal electric field E, is present. According to simple classical theory a polarization electric field, $\bar{v} \times \bar{B}$ is generated in the plasma to allow it to pass through the magnetic field. It is seen therefore that a measurement of the polarization voltage will provide an indication of the gas velocity. A system for measuring the polarization voltage in a flowing gas is shown in FIGURE 1. A coil 2 energized by power supply 4 provides a magnetic field that is transverse to the direction of gas flow G. The gas may, for example be generated from a D.C. plasma generator or rocket motor, etc. (not shown). A pair of tungsten wire electrodes 6 are positioned in the flow and oriented parallel to the flow for detecting the polarization voltage. The electrodes are also disposed so that a line drawn therebetween will be perpendicular to the flux lines of the magnetic field. The electrodes are connected through an isolation transformer 8 and a tuned amplifier 10 to a phase true detector 12. The transformer is used in this case to isolate the amplifier from the probes to avoid ground loops through the arc power supply of the plasma generator. Capacitors 7 are connected in series with the electrodes and the transformer primary winding to limit the D.C. current through this winding. This prevents D.C. loading of the plasma. The detector has a second input connected to the power supply 4 through a delay network 14. The output of the detector is connected to a meter or recorder 16 calibrated to indicate the gas velocity directly.

Calibration of the system shown in FIGURE 1 is obtained by supplying the approximate A.C. voltage to the electrodes which is accurately known and in the same magnitude as that expected and the magnetic field strength is either measured or computed. Before the gas flow is allowed, the back-ground induced field in the measuring circuit must be subtracted from the data. This error is proportional to magnet current and can be taken directly from the power supply. Next the flow is initiated and with no magnetic field a voltage is measured which must be added to that error voltage obtained by a magnetic field with no gas flow. With the circuitry adjusted to compensate for the two error voltages the system provides a true signal and the meter or recorder can be calibrated in appropriate velocity units.

Figure 2:
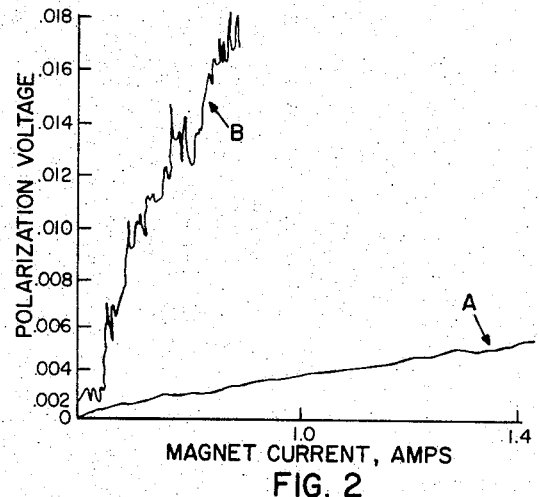
FIGURE 2 is a graph illustrating the relationship between magnet current and polarization voltage.

The data plot illustrated in FIGURE 2 was obtained with an x-y plotter that recorded the RMS polarization voltage versus RMS magnet current. Curve A was taken with no plasma present and curve B was taken in the presence of argon plasma having a flow of 0.19 gm./sec. A similar curve may be plotted to determine the error voltage due to background signals.

A direct current magnetic field can also be used to measure the gas velocity using only a magnetic field coil, a pair of electrodes, an isolation amplifier, and an indicator. However, with the D.C. system it has been found to be necessary to provide for alternately turning the current to the coil on and off. During the "off" position an error voltage is measured and electronically subtracted from the voltage measured during the coil "on" position. This process eliminates errors due to temperature, thermionic emission, etc.

The above described systems, in addition to wind tunnel use where the working fluid is partially ionized, may be used in rocket and jet exhaust flows and also in the ionized boundary layer flow on high speed nose cones.

Figure 3:
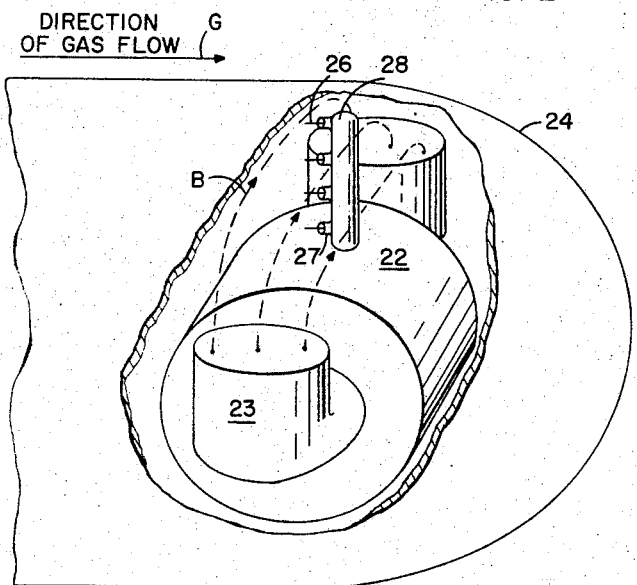
FIGURE 3 illustrates an embodiment of the invention for hypervelocity nose cone flight tests.

The probe structure shown in FIGURE 3 is adapted for hypervelocity nose cone flight test and utilizes a magnetic field producing coil 22 wound about a U-shaped core 23. The coil produces a magnetic field transverse to the direction of gas flow G about a nose cone 24. Electrodes 26 are disposed on the surface of the nose cone parallel to the gas flow direction and transverse to the magnetic field. Electrodes 26 are supported by protrusions 27 on support member 28.

The physical orientation of the probes within a flowing plasma has a further restriction other than merely being aligned parallel to the flow to sample the polarization voltage. This restriction is caused by the plasma self-loading caused by gradients in the product of $\bar{v} \times \bar{B}$. If we assume that a gradient in velocity due to a boundary formed by a wall is present. A curl $\bar{v} \times \bar{B}$ will exist when a velocity gradient component is normal to a constant magnetic field. Circulation currents $\bar{J}$ induced by curl $\bar{v} \times \bar{B}$ will change the electric field in the plasma to $\bar{E}'$ which is reduced from $\bar{v} \times \bar{B}$ by an amount $\bar{J}/\sigma$. Where $\sigma$ is the conductivity of the plasma. This current may also interact with the field B to produce a Lorentz force which will tend to accelerate the slower portions of the boundary layer and slow down the faster portions of the boundary layer and the portion of the uniform velocity flow just outside of the boundary layer. This tends to create a sharper gradient near the surface and effectively increases the depth of the boundary layer. The induced electrical field which must be probed is not affected by self-loading in the plane where gradients in velocity are perpendicular to the applied B field. At other positions the induced electric field is reduced due to the circulation currents arising from plasma self-loading.

While this invention has been described with reference to specific embodiments it will be apparent that various modifications and changes may be made without departing from the spirit of the invention, as defined in the appended claim.

I claim:

A system for measuring the velocity of a flowing plasma comprising: a coil for producing a magnetic field at right angles to the direction of flow of the plasma; an alternating current power supply connected to said coil; a plurality of wire electrodes disposed in said plasma and oriented parallel to the flow of plasma so that a line drawn between said electrodes is perpendicular to the magnetic field and plasma flow direction, said wire electrodes being positioned in a plane in the plasma where gradients in velocity of the plasma are perpendicular to the applied magnetic field; an isolation transformer having a primary winding connected to said electrodes; a tuned amplifier having its input connected to a secondary winding of said transformer; a detector having a first input connected to the output of said amplifier; a delay network connected to said power supply and to a second input of said detector; and an indicator connected to the output of said detector for providing an indication of the velocity of said plasma.

References Cited

UNITED STATES PATENTS

| | | |
|---|---|---|
| 1,249,530 | 12/1917 | Smith et al. |
| 2,729,103 | 1/1956 | Raynsford et al. _____ 73—194 |
| 3,119,259 | 1/1964 | Ten Bosch et al. ____ 73—194 X |
| 3,178,941 | 4/1965 | Berry _____ 78—194 |

FOREIGN PATENTS

| | | |
|---|---|---|
| 969,203 | 9/1964 | Great Britain. |

RICHARD C. QUEISSER, *Primary Examiner.*

JAMES J. GILL, *Examiner.*

C. A. RUEHL, *Assistant Examiner.*